United States Patent [19]

Fey et al.

[11] 3,782,836

[45] Jan. 1, 1974

[54] SURFACE IRREGULARITY ANALYZING METHOD

[75] Inventors: Curt F. Fey, Richardson; Stacy Bennet Watelski, Dallas, both of Tex.

[73] Assignee: Texas Instruments Incorporated, Dallas, Tex.

[22] Filed: Nov. 11, 1971

[21] Appl. No.: 244,302

Related U.S. Application Data

[63] Continuation of Ser. No. 889,407, Dec. 31, 1969, abandoned.

[52] U.S. Cl. .................. 356/209, 356/210, 356/237

[51] Int. Cl. .......................................... G01n 21/32

[58] Field of Search ........................ 356/30, 31, 120, 356/199, 200, 209–212, 237–241; 250/219 DF

[56] References Cited

UNITED STATES PATENTS

| | | | |
|---|---|---|---|
| 1,918,976 | 7/1933 | Marrison | 356/31 |
| 2,858,730 | 11/1958 | Hanson | 356/31 |
| 2,973,687 | 3/1961 | Pennington et al. | 356/31 |
| 2,957,385 | 10/1960 | Grosso et al. | 356/31 |

*Primary Examiner*—John K. Corbin
*Assistant Examiner*—F. L. Evans
*Attorney*—James O. Dixon et al.

[57] ABSTRACT

A surface irregularity analyzing system includes structure for directing light toward a surface in a direction having a certain angular relationship to the surface. If the light strikes irregularities in the surface, it is reflected in a direction having an angular relationship to the surface other than equal and opposite the incident direction. The amount of light reflected from irregularities in the surface is determined, either photographically or photoelectrically, to provide an analysis of irregularities in the surface.

6 Claims, 5 Drawing Figures

INVENTORS
STACY B. WATELSKI
CURT F. FEY

SURFACE IRREGULARITY ANALYZING METHOD

This is a continuation, division, of application Ser. No. 889,407, filed Dec. 31, 1969 now abandoned.

This invention relates to surface irregularity analyzing systems and more particularly to methods of an apparatus for analyzing all of the irregularities in a surface simultaneously.

In many instances it is convenient to assume that semiconductor materials such as silicon, germanium, etc. are comprised of atoms arranged in perfect crystals. In actual practice, however, defects exist throughout the crystalline structures of almost all semiconductor materials. These defects comprise crystal lattice irregularities or dislocations which under certain conditions affect the performance of electronic devices formed from semiconductor materials.

It is now common to expose semiconductor material defects by subjecting semiconductor materials to specific etch solutions. Typically, a surface extending parallel to a particular crystallographic plane is exposed to a dislocation etch solution designed for use with that plane. Such a solution attacks the particular plane, for example, the (111) plane, more slowly than it attacks the other crystallographic planes of the material, for example, the (110) plane, the (100) plane, etc. By this means, the dislocation etch solution forms a "pit" for each defect in the crystalline structure of the semiconductor material that is located at or near the surface of the material.

The number of defects in the surface of a body of semiconductor material is an indication of the quality of the material. Accordingly, after a surface has been dislocation etched, the surface is analyzed to determine the number of dislocation etch pits in the surface. Heretofore, such an analysis has comprised a microscopic examination of the surface. In accordance with a test procedure promulgated by the American Society for Testing Materials, a small number of points arranged in a particular manner on an etched surface are microscopically examined and the results are extrapolated over the entire surface.

The analyzation of dislocation etch pits by means of a microscope is unsatisfactory for several reasons. First, such an analysis is time consuming and must be performed by a skilled technician. Second, when a small number for points on a surface are examined, clusters of pits in non-examined portions of the surface are often overlooked. Third, such an analysis does not take into consideration the arrangement of the pits on a surface.

In accordance with the present invention, a surface is analyzed by directing light onto the surface and determining the amount of light that is reflected from irregularities in the surface. Preferably, the entire surface is analyzed at once. By using the invention, an unskilled operator can quickly make an analysis of both the number and arrangement of all of the dislocation etch pits in a semiconductor surface.

A more complete understanding of the invention may be had by referring to the following detailed description when taken in conjunction with the drawing, wherein.

Figures 1, 2, 3, 4, 5:
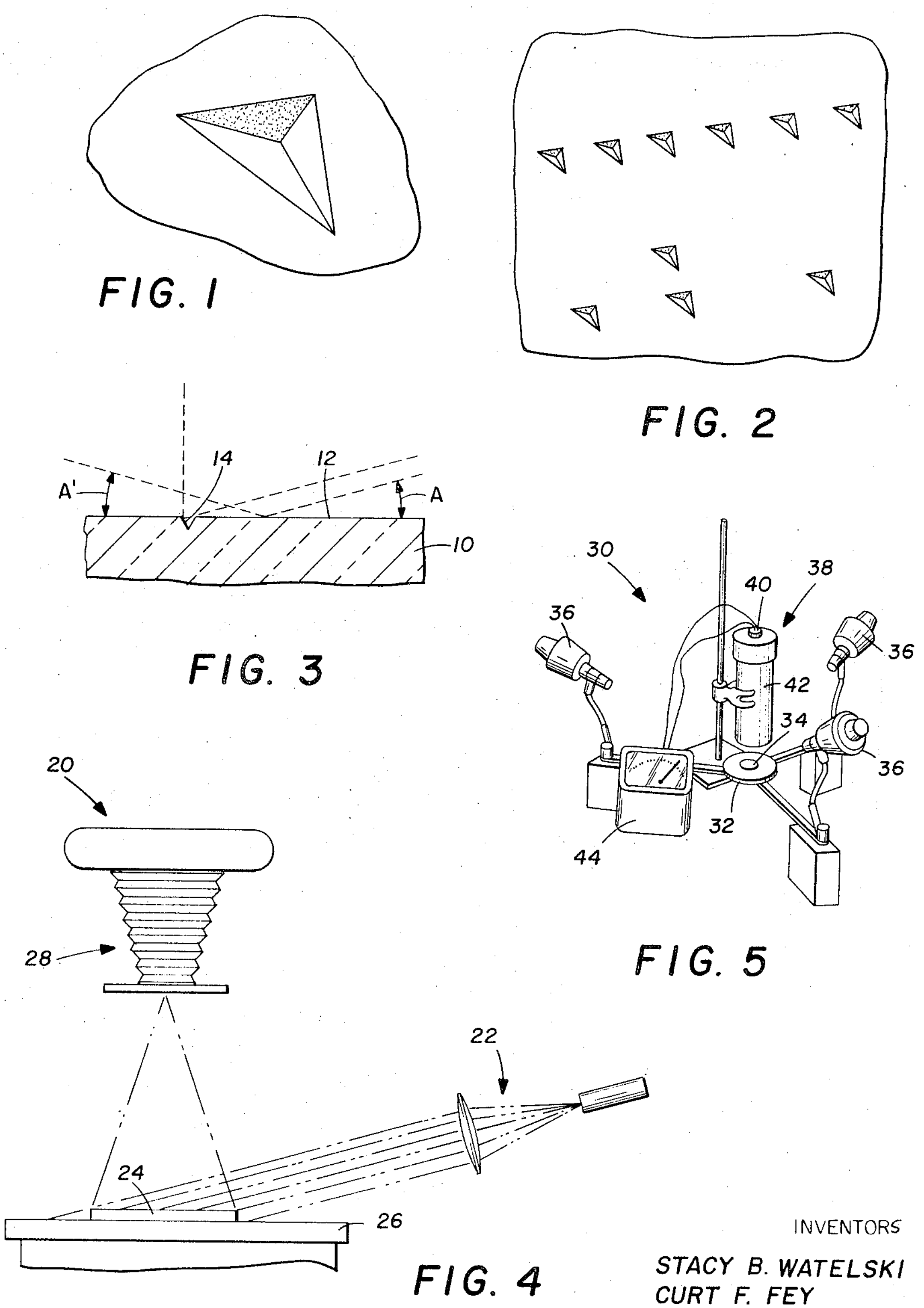
FIG. 1 is an enlarged isometric view of a dislocation etch pit.
FIG. 2 is an isometric view of a portion of a surface having dislocation etch pits formed in it.
FIG. 3 is an illustration of a method of analyzing surfaces employing the invention.
FIG. 4 is a front view of a first surface analyzing system employing the invention.
FIG. 5 is a prespective view of a second surface analyzing system employing the method illustrated in FIG. 3.

Referring now to the drawings, FIG. 1 comprises an illustration of a dislocation etch pit formed in a surface extending parallel to the (111) crystallographic plane of a body of semiconductor material. The pit comprises a tetrahedron-shaped cavity comprised of side walls that extend at an angle of 70.53° with respect to the (111) plane. Dislocation etch pits of the type shown in FIG. 1 are formed by exposing a (111) semiconductor surface to one of the commercially available (111) plane dislocation etch solutions.

When a body of semiconductor material having a (111) surface is exposed to a (111) dislocation etch solution, the rate at which the etch solution attacks the crystallographic planes of the material other than the (111) plane is greater than the rate at which it attacks the (111) plane. Therefore, the dislocation etch solution forms each defect in the crystalline structure of the (111) surface into a dislocation etch pit having the shape shown in FIG. 1. The same result is obtained in any semiconductor material so long as a dislocation etch solution designed for the particular material is used.

It should be understood that the disolcation etch pits can be formed in any semiconductor surface by exposing the surface to a suitable dislocation etch solution. However, pits formed in surfaces other than (111) surfaces do not necessarily have the shape of the pit shown in FIG. 1. For example, dislocation etch pits formed in (100 and 110) surfaces comprise inverted four sided pyramids that are diamond or "boat" shaped and square, respectively.

Referring now to FIG. 2, a typical (111) surface having a plurality of dislocation etch pits formed in it is shown. A typical dislocation etched surface includes both randomly arranged dislocation etch pits and dislocation etch pits arranged along lines of the type shown in the upper portion of FIG. 2. Such lines are known as "slip lines" and are frequently arranged in hexagonal or Star of David patterns on a (111) surface. Accordingly, in analyzing such a surface, both the total number of dislocation pits and the arrangement of the pits on the surface are of interest in determining the quality of the semiconductor material including the surface.

Upon careful examination, it will be noted that all of the dislocation etch pits shown in FIG. 2 are comprised of walls that extend in the same three directions. This is because each wall of a dislocation etch pit extends parallel to one of crystallographic planes of the semiconductor material in which the pit is formed. In the case of (111) etch pits, the wall directions are spaced at 120° intervals with respect to each other.

A method of analyzing surface irregularities in accordance with the present invention is shown in FIG. 3. A body of semiconductor material 10 has a surface 12 formed on it that extends in the direction of the (111) plane of the crystal lattice of the body 10. The plane 12 has previously been exposed to a (111) plane dislocation etch solution and, accordingly, the plane 12 has dislocation etch pits 14 formed in it.

Light is directed toward the surface 12 along a path that extends at an angle A relative to the surface. In accordance with the preferred embodiment, the light is directed toward the surface 12 at an appropriate angle A, such as a low angle of less than 45°. Light striking portions of the surface 12 that have not been attacked by the dislocation etch solution is reflected along a path that extends at an angle A' relative to the surface. Of course, the angle A' is equal and opposite to the incident angle A.

Light entering a dislocation etch pit 14 in the surface 12 strikes a wall of the pit. Since the walls of the pit extend angularly relative to the surface 12, light entering a dislocation etch pit is not reflected along the path characterized by the angle A'. Rather, it is reflected between the various walls of the pit and finally generally upwardly.

Since the portions of the surface 12 that were not attacked by the dislocation etch solution do not reflect light upwardly, the dislocation etch pits 14 in the surface 12 appear bright when viewed from above. Thus, if light is directed onto the entire area of the surface 12, all of the dislocation etch pits in the surface are simultaneously illuminated against a dark background. If the surface is thereafter observed from above, the number, size, pattern, etc. of the pits in the surface can be determined.

A first surface irregularity analyzing system 20 employing the method illustrated in FIG. 3 is shown in FIG. 4. The system 20 includes a source of collimated light 22 including a lamp and a collimating lens. The source 22 directs light onto a semiconductor slice 24 having an upper surface that has been subjected to a dislocation etch solution. The slice 24 is mounted on a table 26 that is preferably highly reflective and that is preferably mounted for rotation relative to the light source 22. The system 20 further includes a camera 28.

In the use of the system 20, the camera 28 is positioned to photograph an entire slice 24 and is focused on the upper surface of the slice. The light source 22 is activated and the table 26 is rotated while the slice 24 is observed through the view finder of the camera 28. As the crystallographic plane of the slice 24 that extends in one of the wall directions of the dislocation etch pits in the slice becomes perpendicular to the path of light from the source 22, the intensity of the light that is reflected upwardly from the slice 24 increases rapidly. When the intensity of the light that is reflected toward the camera 28 is at a maximum, the table 26 is stopped and the slice 24 is photographed.

The photograph of the slice 24 comprises a record of every dislocation etch pit in the slice 24. By visually inspecting the photograph, the number, pattern, etc. of the pits in the slice can be determined. In this manner, the entire area of the upper surface of the slice is analyzed simultaneously.

In actual practice, it is preferable to make a series of exposures of each slice, one for each wall direction of the dislocation etch pits in the slice. This can be accomplished using the same negative or a series of negatives, as desired, and is necessary because in some instances certain pits in a surface are not illuminated when light is directed toward the surface from one of the wall directions. The various wall directions are preferably aligned with the light from the source 22 by moving the source 22 relative to the table 26. However, the table 26 may also be rotated relative to the source 22, if desired.

A second surface irregularity analyzing system 30 which also employs the method illustrated in FIG. 3 is shown in FIG. 5. The system 30 is similar to the system 20 in that it includes a highly reflective table 32 having a dislocation etched semiconductor slice 34 positioned on it. The system 30 differs from the system 20 in that it includes a plurality of light sources 36. Also, rather than a camera, the system 30 includes a photo-sensitive assembly 38 comprising a light sensor 40, a tube 42 including a lens (not shown) and a meter 44. The tube 42 extends downwardly from the light sensor 40 toward the slice 34 and preferably has a substantially non-reflective inner wall. The meter 44 is coupled to the output of the light sensor 40.

In the use of the system 30 to analyze dislocation etched (111) surface, for example, three light sources 36 are positioned at 120° intervals and are orientated relative to the slice 34 so that all of the sides of the dislocation etch pits of the slice are illuminated simultaneously. The photosensitive assembly 38 is then activated whereupon the meter 44 produces an output indicative of the intensity of light reflected upwardly from the slice 34. The light sensor 40 and the tube 42 are so arranged that the photocell receives light reflected from the entire upper surface of the slice 34 simultaneously. Therefore, the display of the meter 44 comprises a measurement of the total number of dislocation etch pits in the slice 34.

The system 30 is preferably calibrated by one of the techniques commonly employed to calibrate testing systems. In accordance with one such technique, a number of slices each having uniform etch pit distribution and no evidence of slip and having etch pit counts ranging from zero to about one million pits per square centimeter are selected. The number of pits in each slice is determined by the American Society for Testing Materials procedure, each slice is analyzed using the system 30 and a plot of the display of the meter 44 as a function of the number of pits in a slice is prepared. Thereafter, the meter and the plot are used to determine the number of pits in a surface and the use of the ASTM procedure is discontinued.

It should be understood that both the system 20 and the system 30 can be employed to analyze specimens including surfaces extending in the direction of any crystallographic plane. By way of example only, if the system 20 is employed to analyze (111) surfaces, the table 26 is first rotated until a point of maximum reflection is reached. Thereafter, the source 22 is moved between two 120° increments. When surfaces extending in the direction of other crystallographic planes are analyzed, for example, (110) and (100) surfaces, the table is again rotated until a point of maximum reflection is reached. Thereafter, the source 22 is moved to other points of maximum reflection. An exposure is made at the first and at each succeeding point of maximum reflection so that light reflected from each wall of each pit in the surface is recorded. Thus, the operation of the system 20 is the same regardless of the orientation of the surface being analyzed.

When the system 30 is employed to analyze non-(111) surfaces, for example (110) or (100) surfaces, four light sources 36 are employed. The light sources are positioned to simultaneously direct light onto all of the walls of the dislocation etch pits in the surfaces being analyzed. Thereafter, the operation of the system 30 is exactly the same as the operation of the system when it is employed to analyze (111) surfaces. Of course, if the specimen has dislocation etch pits of non-uniform geometry, an appropriate member of light sources appropriately oriented about the specimen are used.

It should be further understood that the camera 28 of the system 20 can be employed in the system 30 rather than the photosensitive assembly 38 and that the photosensitive assembly 38 of the system 30 can be employed in the system 20 rather than the camera 28. The use of a camera to analyze a surface in accordance with the method illustrated in FIG. 3 is advantageous in that it provides an indication of the arrangement of the dislocation etch pits in a surface. The use of a photosensitive assembly is advantageous in that such an assembly can be made sensitive to reflections not visible to the naked eye. Accordingly, in many systems it is advantageous to analyze a surface both photographically and photoelectrically in order to provide the complete determination of the quality of the surface.

The surface analyzing systems 20 and 30 can both be operated otherwise than in accordance with the method illustrated in FIG. 3. For example, radiation other than light can be employed in the operation of either system so long as the radiation reflects from the surface being analyzed. Also, the system 30 can be provided with light sources that are polarized or that generate different colors of light. If a camera equipped with color film is employed in a system of the latter type, each set of walls in selected direction of the dislocation etch pits are individually recorded. If a polarized light system is employed, an analyzer is employed at the light sensor to reduce unwanted background reflections from the specimen and table. Further, the system 30 can comprise a single light source positioned above a surface and a plurality of photosensitive devices positioned at spaced intervals in alignment with the wall directions of dislocation etch pits in the surface. Finally, the systems 20 and 30 can be employed to analyze irregularities in any surface and are not limited to uses involving analyses of dislocation etch pits in semiconductor surfaces.

Although various embodiments of the invention are illustrated in the drawing and described herein, it will be understood that the invention is not limited to the embodiments disclosed but is capable of rearrangement, modification and substitution of parts and elements without departing from the spirit of the invention.

What is Claimed is:

1. A method of detecting defects in the crystallographic structure of a predetermined plane of a material sample comprising:

a. exposing a sample surface extending in a plane parallel to a given crystallographic plane of the material to a dislocation etch solution to produce etch pits having plane wall surfaces lying in crystallographic planes other than the plane of said surface;

b. directing light to said surface from a direction having an angular relationship to said surface which is less than 90°; and c. detecting light reflected directly from a wall surface of said etch pits as an indication of the number and location of defects on said surface.

2. The method defined in claim 1 including the further step of providing a measure of the quantity of light reflected directly from said etch pit wall surfaces.

3. The method defined in claim 1 further including the step of recording the location of said reflected light from each of said etch pits on said surface to provide a record of the number and location of defects on said surface.

4. A method of detecting defects in the crystallographic structure of a slice of semiconductor material comprising:

a. exposing a surface of said slice extending in a plane parallel to a given crystallographic plane thereof to a disclocation etch solution to produce in said surface etch pits at defect locations having wall surfaces lying in crystallographic planes other than said surface plane;

b. illuminating said etch pits from a plurality of collimated light sources so arranged that light from one of said sources reflected from etch pit walls lying in one crystallographic plane is reflected in the same direction as light from another of said sources reflected from etch pit walls lying in a different crystallographic plane, and detecting the light reflected directly from the wall surfaces of said etch pits.

5. The method as defined in claim 4 further comprising the step of providing a measure of the total amount of light reflected directly from said etch pit walls.

6. The method defined in claim 5 including the further step of recording said measure of light so reflected.

* * * * *